Jan. 16, 1923.
E. F. NORELIUS.
RESILIENT PUSH ROD FOR TRACTOR TRUCK MECHANISM.
FILED SEPT 16, 1919.
1,442,580
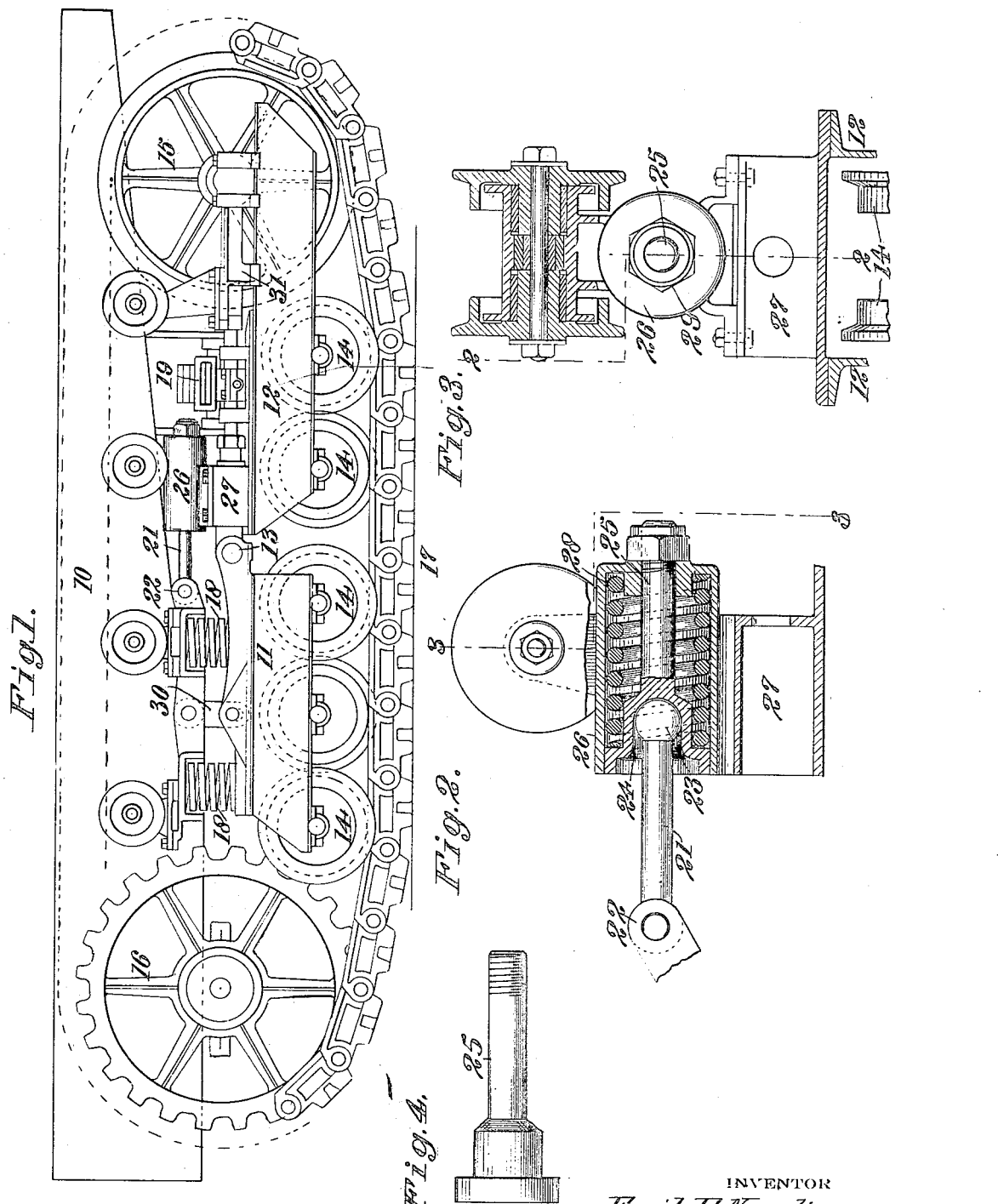
INVENTOR
Emil F. Norelius
BY Strong & Townsend
ATTORNEYS Patented Jan. 16, 1923.

1,442,580

UNITED STATES PATENT OFFICE.

EMIL F. NORELIUS, OF PEORIA, ILLINOIS, ASSIGNOR TO THE HOLT MANUFACTURING COMPANY, OF STOCKTON, CALIFORNIA, A CORPORATION OF CALIFORNIA.

RESILIENT PUSH ROD FOR TRACTOR TRUCK MECHANISM.

Application filed September 16, 1919. Serial No. 324,224.

*To all whom it may concern:*

Be it known that I, EMIL F. NORELIUS, a citizen of the United States, residing at Peoria, in the county of Peoria and State of Illinois, have invented new and useful Improvements in Resilient Push Rods for Tractor Truck Mechanism, of which the following is a specification.

This invention relates to tractors of the chain track type, and more particularly to a yielding thrust connection between the main frame and the roller truck mechanism of the general form shown and described in co-pending application Serial No. 290,431, filed April 16, 1919.

In the prior application, there is provided a yielding thrust connection between the main frame and the track mechanism such that the truck members may move rearwardly relative to the sprocket wheel and thus allow slack to be produced in the track, whereupon any obstructions coming between the track chain and the sprocket wheels may pass around without danger of breaking the track.

In the present application, I have improved and simplified this thrust connection in such a way that greater freedom of movement between the main frame and truck mechanism is permitted and also the spring is enclosed in a manner to prevent deposit of mud thereon and consequent failure of the spring to function.

Referring to the accompanying drawings:—

Fig. 1 shows a side elevation of the tractor embodying my invention.

Fig. 2 shows a sectional view of the yielding connection between the main frame and the truck frame, taken on the line 2—2 of Fig. 3.

Fig. 3 shows a sectional view, taken on the line 3—3 of Fig. 2.

Fig. 4 shows a plan view of one member forming the connection.

The tractor herein shown comprises a main frame 10, on the opposite sides of which is a truck mechanism made up of truck members 11 and 12, hinged together at 13. The truck member carries a series of rollers 14 and the forward truck member has journaled upon it an idler sprocket wheel 15. The driving sprocket wheel 16 is journaled upon the main frame, and around this sprocket wheel and the idler wheel 15 and passing beneath the rollers 14 is an endless chain track 17. The main frame is supported at each side upon the rear truck members by means of springs 18, and centrally upon the forward truck members by means of a transversely extending equalizer bar 19; said bar 19 being pivotally connected to the main frame and to opposite forward truck members in a manner to allow the said truck members to rock vertically independently of each other and of the main frame.

As in the device of the prior application above-mentioned I employ a yielding connection for the push-rod, such that these truck mechanisms are capable of moving relatively to the sprocket driving wheels when sufficient pressure is applied in that direction, and as a consequence any obstruction falling upon the track could pass entirely around without danger of breaking any of the parts, inasmuch as this relative movement between the truck mechanism and the driving sprocket wheels will allow slack to be produced in the track to accommodate the obstruction. The push-rod at each side is indicated by the numeral 21 and is pivotally connected to the main frame at 22. It has a ball 23 at its forward end which seats in a socket 24 in a manner to allow universal movement. This socket 24 forms the head of a bolt 25, which latter is slidably carried in a cylinder 26; said cylinder 26 being formed upon a bracket 27, which bracket is rigidly connected to the forward truck member, 12. Within the cylinder 26 and pressing rearwardly on the socket 24 is an expansible coil spring 28 which maintains the slide bolt at its rearward limit of movement, said limit being adjustably maintained by the nut 29 on said bolt.

There is a connection between each rear truck member 11 and the main frame in the form of a pendent link 30, which link serves to prevent the truck member from dropping down too far from the main frame when passing over a ditch or depression, but in no wise prevents movement of the truck member fore and aft relative to the main frame.

In operation, when sufficient force is applied to the truck mechanism tending to move it rearwardly, it will be seen that the spring 28 will be compressed and permit such movement of the truck mechanism, and this is what occurs when any unyielding obstruction becomes lodged between the track and sprocket wheels. Sufficient slack is thereby produced in the track to permit the obstruction to pass safely around the sprocket wheels.

The equalizer bar 19, as is well known in this type of tractor, has a central pivotal connection with the main frame and consequently it in no wise interferes with such movement of the truck mechanism as is necessary to compress the spring 28 and produce slack in the track. In the form herein shown the bracket 27, on which the cylinder 26 is formed, also houses a thrust yoke 31, which yoke, as is understood in this type of construction, carries at its forward ends the bearings for the front idler wheel 15. The bearings are slidable upon the forward truck frame and are movable back and forth by lengthening or shortening the thrust yoke for the purpose of taking up slack in the track due to wear, the said thrust yoke being made adjustable for this purpose.

Due to the action of the equalizer bar 19 there occurs a slight variation in the distance between opposite truck mechanisms, when they rock in a vertical plane or when they move rearwardly, being brought somewhat closer together at such times. For this reason the ball and socket connection 23—24 is important, since it permits of slight lateral deviation of each truck mechanism relative to the main frame.

The cylinder 26 forms an enclosed housing for the spring, and thus prevents lodging of mud on the spring. Without the housing the accumulated mud becomes caked and interferes with the action of the spring.

Various changes in the construction and arrangement of the several parts herein shown and described may be employed without departing from the spirit of my invention as disclosed in the appended claims.

Having thus described my invention, what I claim and desire to secure by Letters Patent is—

1. In a chain track tractor, the combination of a main frame, a driving sprocket wheel fixed upon the main frame, a truck mechanism carrying supporting rollers, an idler sprocket wheel, a yielding thrust connection between the truck mechanism and the main frame whereby the said truck mechanism is free to move relatively to the driving sprocket wheel, said connection comprising a housing, a member slidable within the housing, a spring within the housing for retaining the sliding member in extended position and a push rod having a universal connection with the sliding member.

2. In a chain track tractor, the combination of a main frame, a driving sprocket wheel fixed upon the main frame, a truck mechanism carrying supporting rollers, an idler sprocket wheel, a yielding thrust connection between the truck mechanism and the main frame whereby the said truck mechanism is free to move relatively to the driving sprocket wheel, said connection comprising a housing on the truck frame, a rod slidable within the housing, a spring within the housing for retaining the rod in extended position, means for adjusting the position of the rod in the housing and a push rod between the sliding rod and the main frame.

3. In a chain track tractor, the combination of a main frame, roller truck mechanism at each side for supporting the main frame, a sprocket wheel for the chain track fixed upon the main frame, a second sprocket wheel for the track mounted upon the truck mechanism, and thrust means connecting the truck mechanism to the main frame and yieldable to permit said truck mechanism to move relatively to the sprocket wheel on the main frame, said means comprising a housing on the truck mechanism, a spring within the housing, and a rod slidable within the housing and held extended by the spring, and a link pivotally connected to the main frame and having a ball and socket connection with the spring pressed rod.

In testimony whereof I have hereunto set my hand in the presence of two subscribing witnesses.

EMIL F. NORELIUS.

Witnesses:
FRED GROTTS,
WILLIAM TURNBULL.